Jan. 10, 1961 S. R. OVSHINSKY 2,967,980
ELECTRICAL POWER ASSIST OR SERVO MECHANISM
AND CONTROL MEANS THEREFOR
Filed March 26, 1956 3 Sheets-Sheet 3

INVENTOR
STANFORD R. OVSHINSKY
BY Teller & McCormick
ATTORNEY

United States Patent Office 2,967,980
Patented Jan. 10, 1961

2,967,980

ELECTRICAL POWER ASSIST OR SERVO MECHANISM AND CONTROL MEANS THEREFOR

Stanford R. Ovshinsky, 14121 W. McNichols Road, Detroit, Mich., assignor of one-third to David Tann and one-third to Herbert C. Ovshinsky, both of Detroit, Mich.

Filed Mar. 26, 1956, Ser. No. 573,724

4 Claims. (Cl. 317—123)

This invention relates to improvements in electrically operated power transmission systems or apparatus such as may comprise a power assist or servo mechanism, and the invention relates particularly to an improved electrical control means or unit for such a system or mechanism.

The type of servo mechanism to be considered here is adapted to supplement or to assist manual operation of a device or mechanism so as to reduce the manual effort necessary to obtain a desired mechanical result with the said device or mechanism. One such servo mechanism will be described, namely, a power steering mechanism, but it will be understood that the invention applies to other servo mechanisms of the general type mentioned, and it will be abundantly clear that the control device used in the mechanism to be described will find application in many electrical systems and mechanisms other than servo or power assist mechanisms.

A power steering mechanism has been selected to illustrate the present invention because it is believed that the advantages and objects of the invention will become apparent in such environment even to persons of limited mechanical skill but who nonetheless are well acquainted with the problems, the difficulties and the effort involved in wholly manual steering of a vehicle. In such environment, the steering apparatus of a vehicle (including the steering wheel, the steering column and associated linkages and elements) constitute the mechanical device or mechanism which is manually operated to obtain a mechanical result, the mechanical result being a desired or selected turn of the vehicle wheels. The manual effort necessary to obtain the mechanical result, i.e., to make a desired turn, varies under different conditions. When a vehicle is driven along a relatively flat surface at a substantial speed, little manual effort is necessary to turn the vehicle with the steering mechanism. On the other hand, if the vehicle is standing, the manual effort necessary to turn the vehicle wheels is considerably greater and may be even greater if the vehicle stands upon a surface which is other than flat and which may be soft.

Power steering mechanisms have been developed and put to use which reduce the over-all manual effort involved in steering, but which are nonetheless subject to certain disadvantages. For example, there are some power steering systems and mechanisms which are capable of furnishing maximum power assist only when the vehicle engine is operated at high speed. It is the unusual case when power assist is necessary or even desirable during high speed engine operation. Power assist is more frequently needed during low speed engine operation as, for example, when a vehicle is first started and being turned into traffic from a parked or standing position. Other power steering mechanisms have been developed to provide substantially constant power under all operating conditions. This, in itself, is a disadvantage since most drivers prefer a demand system such as will provide maximum power assist during periods of maximum manual effort and minimum or no power assist when the manual effort required is at a minimum. Still other power steering systems which supply power in keeping with the manual effort required do not supply the power smoothly or uniformly. That is, power is added or subtracted to the manual effort in determinable and oftentimes undesirably noticeable increments.

One of the important and specific objects of this invention is to provide control means which will increase and decrease the assist of a servo mechanism to a manual effort smoothly and not in increments or steps.

Another object of the invention is to provide an electrically operated power assist or servo mechanism having control means comprising a variable resistance which is particularly characterized by its infinite resolution whereby power can be adjusted smoothly and not step-by-step within the complete range available.

A further object of the invention is to provide a power assist or servo mechanism employing the aforementioned control means and wherein the power supplied to assist a manual effort is in keeping with the manual requirements.

Other objects as well as advantages of the invention will become apparent from the following description taken in connection with the attached drawings wherein, by way of example only, there are but a few embodiments of the invention shown. As will become apparent from the claims forming a part of this specification, the invention is not limited to the forms shown in the drawings and, therefore, the drawings and the description thereof should not be taken as defining the limits or scope of the invention.

As suggested hereinabove, it is an important feature of this invention that a control resistor is provided for varying the power assist of an electrically operated servo mechanism in other than step-by-step fashion within the complete power range. As a result, variation in the power assist to a manual operation cannot deleteriously affect such manual operation or can variations in the power assist cause "chatter" in the servo mechanism or erratic attainment or realization of the desired mechanical result. The improved control means provided in accordance with this invention can be described generally as comprising a magnetic particle resistor wherein relatively movable magnet elements control the disposition of the magnetic particles and wherein said magnet elements constitute electrodes in a power circuit to the servo mechanism. The current flow across the electrodes takes place through the magnetic particles and the said current flow is varied by relative displacement of the electrode-magnet elements. If the electrode-magnet elements are disposed so as to attract the maximum number of magnetic particles into conducting chains between the said elements, the resistance to current flow between the electrodes will be at a minimum. Relative lateral movement or displacement of the said elements will displace the magnetic field and will vary the resistance to current flow by displacing the magnetic particles, or some of them, from the current path. Obviously, a control resistor as described above can be provided in many specific forms.

Figures 1, 2, 3:
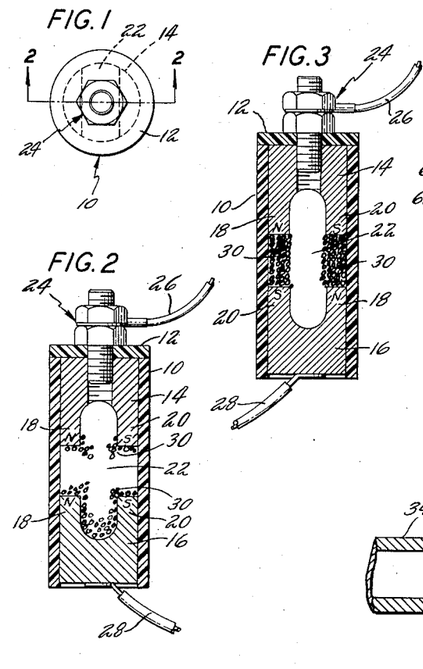
Fig. 1 is a top plan or end view of a control resistor constructed in accordance with the present invention.
Fig. 2 is a vertical cross-sectional view of the resistor taken as indicated by the line 2—2 of Fig. 1.
Fig. 3 is a view similar to Fig. 2 but showing elements of the resistor in adjusted position.

The exemplary form of a magnetic particle control resistor shown in Figs. 1–3 is characterized by its simplicity. As shown therein, the resistor many comprise an insulating housing 10 preferably in cylindrical form and which is preferably closed at one end as indicated at 12. A pair of permanent magnets 14 and 16 are disposed within the housing 10 for relative movement. Preferably, the magnets are formed in generally horseshoe shape each having spaced apart north and south pole pieces 18 and 20, respectively. The magnets 14 and 16 are located within the housing 10 with their pole pieces 18 and 20 spaced from each other to define a particle cavity 22 within the said housing and between the said pole pieces. One of the magnets, for example, the magnet 14 can be fixedly secured within the housing 10 and electrically connected as by means indicated generally at 24 to a conductor 26. The other of the magnets, for example the magnet 16, is rotatably disposed within the housing 10 and is electrically connected to a conductor 28. A plurality of magnetic particles 30, such as iron shot, are disposed within the cavity 22 in any desired amount.

When the rotatable magnet 16 is in the rotated position shown in Fig. 2 wherein its north pole 18 is opposite the north pole 18 on the magnet 14 and wherein the south poles 20, 20 are opposed, the magnetic particles are not influenced to form into conducting chains between the respective poles of the magnet elements. This, of course, occurs because the magnetic field is at a minimum. Unless the cavity 22 is substantially filled with magnetic particles 30, 30, there will be no electrical interconnection between the magnets 14 and 16 and no current will flow from the conductor 26 to the conductor 28. In any event, the resistance to current flow will be at a maximum for the number of magnetic particles provided.

If the rotatable magnet 16 is displaced by rotation from its position shown in Fig. 2 toward the position shown in Fig. 3 wherein the north and south poles on the respective magnets 14 and 16 are opposed, the magnetic field will be displaced and intensified during such rotation. As the magnetic field builds up, the magnetic particles 30 are aligned in the flux pattern to form conducting chains across the pole pieces of the magnets 14 and 16. After the magnet 16 has been rotated 180° from the position shown in Fig. 2 to the position shown in Fig. 3, the greatest number of particles will be influenced into the conducting chains and resistance to current flow will be at a minimum. In Figs. 2 and 3, only a few particles are shown within the cavity to illustrate the magnetic effect. It is contemplated that in most installations the cavity will be substantially filled with particles.

The magnetic and electrical theory behind operation of the control resistor described above is obvious. That is, when the magnetic particles are repelled due to the relative position of the magnetic pole faces, the said magnetic particles are loosely coupled and provide the greatest resistance. When the magnetic particles are attracted, due to the relative position of the magnetic pole faces, they are tightly coupled and resistance to current flow is minimized. In a resistor having the particle cavity 22 filled or substantially filled with particles 30, and with the like poles on the respective magnets opposed whereby the particles are repelled from one another, the resistance is increased in the same manner resistance is increased by lengthening a conductor. In addition to the aforementioned factors, relative rotation of the magnets thereby causing displacement of the pole faces, changes the effective cross-sectional area through the magnetic particles. Since resistance varies inversely with the cross-sectional area of an electrical conductor, it will be quite apparent that the resistance decreases when the opposed north and south poles are brought into opposed relationship. It will also be apparent that the resistor described above is particularly characterized by its quality of resolution. That is, there is no step-by-step increase or decrease of resistance during relative rotation or lateral displacement of the magnets such as occurs by step-by-step movement from one convolution to another in a wire wound resistor. The relative rotation of the magents changes the resistance to current flow therebetween in a wave-like manner thereby accounting for the quality of resolution provided.

It is believed that a magnetic particle control resistor of the type provided in accordance with this invention is a distinct improvement over the best of the known control resistors because of the resolution factor. Perhaps the best resistor of the types heretofore known is the wire wound resistor which has a brush movable along the resistor from convolution to convolution. In wire wound resistors there is the ever present problem of brush wear and, in addition, the resolution factor presents a disadvantage. That is, resistance can be varied only in step-by-step fashion, the steps occurring with each convolution. The steps or increments are minimized by using fine wire tightly wound, but in any heavy duty, high wattage installation, heavy wire must necessarily be used.

With the control resistor provided herein, there is no wear problem and, more importantly, the resolution of the resistor is infinite thus providing for control adjustment in other than increments or step-by-step fashion. The adjustment is secured with a minimum of effort, merely by relative lateral movement of the electrode-magnet elements. Thus, the present invention provides a new approach to electrical control and not merely an improvement in an old approach or apparatus.

Figure 4:
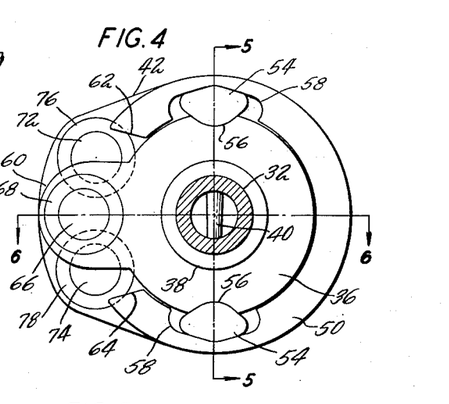
Fig. 4 is a top plan view of an alternative form of control resistor.
Figure 5:
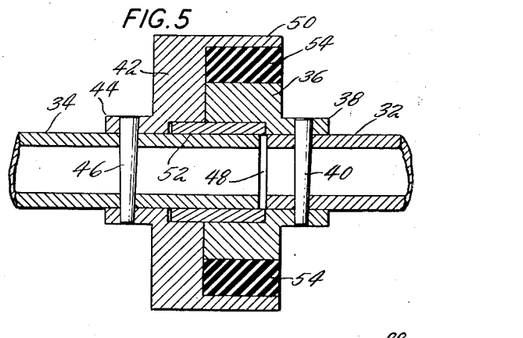
Fig. 5 is a transverse sectional view of the resistor shown in Fig. 4 and taken as indicated by the line 5—5 thereof.
Figure 6:
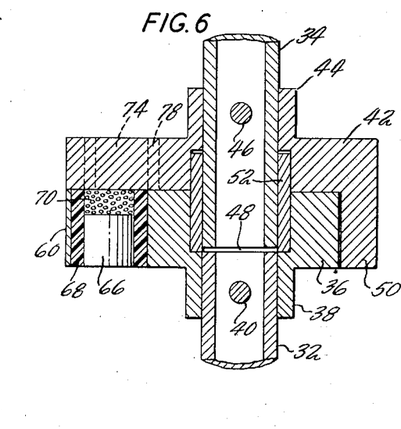
Fig. 6 is another transverse sectional view taken as indicated by the line 6—6 of Fig. 4.

A control resistor of the aforedescribed general type can conveniently be employed to control current flow in the power circuit of electrically operable means, such as a servo mechanism adapted to assist a manual operation, if such manual operation or effort is utilized to cause relative movement or displacement of the electrode-magnets in the resistor. A control resistor as shown in Figs. 4–6 is particularly adapted to utilize the manual effort in operation of mechanical elements to control current flow so as to energize a servo mechanism to assist in the manual effort. More specifically, the control resistor of Figs. 4–6 is shown as incorporated in the coupling between a pair of shafts 32 and 34 which are to be rotated by manual effort. Assume, for example, that the shafts 32 and 34 comprise sections of a steering column for a vehicle, the shaft 32 being connected with the steering wheel, and thus being manually operable, and the shaft 34 being connected by conventional linkages with the wheels of a vehicle. The coupling between the shafts 32 and 34 which includes the control resistor comprises a resilient coupling therebetween and under certain operating conditions the said coupling provides for limited relative movement or lost motion between the steering column sections 32 and 34. The major elements of the coupling comprise a generally circular plate 36 having a hub 38 which is connected with the shaft 32 as by a pin 40, and a plate 42 having a hub 44 which is connected with the shaft 34 as by a pin 46. The plates 36 and 42 engage each other face-to-face with the ends of the shafts 32 and 34 spaced apart as indicated at 48. The plate 36 is of less diameter than the plate 42, the plate 42 being provided with a peripheral flange or rim segment 50 surrounding a substantial portion of the plate 36 in closely spaced relationship. The plates 36 and 42 are engaged in the aforedescribed face-to-face relationship on a bushing 52.

A resilient driving connection is made between the plates 36 and 42 by providing a plurality of rubber on rubber-like packs or inserts 54, 54 which frictionally engage the periphery of the plate 36 and the inner face of the peripheral segment 50 on the plate 42. More specifically, the rubber inserts are seated in suitable cavities 56, 56 provided in diametrically opposed locations on the periphery of the plate 36 and the said inserts are also seated within the recesses 58, 58 provided in the inner wall of the overhanging peripheral segment 50 of the plate 42. When the shaft 32 is turned or rotated by movement of a steering wheel, the rubber packs 54, 54 are compressed in the cavities and recesses 56 and 58, frictional engagement of the packs causing the plate 42 and the shaft 34 to be turned or rotated with the shaft 32. Obviously, if the resistance of the shaft 34 to turning is slight, the packs 54, 54 are only slightly compressed by the manual effort in turning the shaft 32 and causing the shaft 34 to be turned or rotated. If the resistance of the shaft 34 is relatively great, the packs 54, 54 will be further compressed in the manual effort of turning the shaft 32 before the shaft 34 is turned or rotated. The turning resistance of the shaft 34 is occasioned by resistance of the vehicle wheels to a turn. If such resistance is sufficiently great, the packs 54, 54 may be compressed to their limits within the recesses 58, 58 on the plate rim 50 and may engage one or the other end of the said recesses before the plate 42 and shaft 34 are turned.

A radially extending appendage 60 is provided on the plate 36 to engage the respective ends of the peripheral rim segment 50 on the plate 42 when the shaft 34 offers relatively great resistance to turning. More specifically, the appendage 60 will engage the end 62 of the rim 50 in a resisted right turn (clockwise as viewed in Fig. 4) of the shaft 32. After the appendage 60 has engaged the end 62 in a right turn of the shaft 32 and the plate 36, the plate 42 and the shaft 34 will turn with the shaft 32. In a resisted left turn of the shaft 32 and plate 36 (counterclockwise as viewed in Fig. 4), the appendage 60 will engage the end 64 of the peripheral rim 50 to rotate the plate 42 and shaft 34 with the shaft 32.

The appendage 60 is provided with a suitable aperture wherein there is located a magnet 66 within an insulating sleeve 68. The magnet 66 is spaced from the side of the plate 36 upon which the plate 42 is superimposed to define a cavity which is filled or partially filled with magnetic particles 70. When the shaft 32 is turned and the packs 54, 54 are initially compressed and before the appendage strikes the ends 62 or 64 of the rim 50, the said appendage will wipe across the adjacent surface of the plate 42. There are two magnets 72 and 74 located in the plate 42 with their ends located in the plane of the said adjacent surface, the said magnets being disposed within insulating sleeves 76 and 78, respectively. Now, in making a resisted right turn with the resilient coupling and wherein there is limited relative movement between the plates 36 and 42, the magnet 66 and the particles 70 will be wiped across the abutting face of the plate 42 to bring the magnet 72 over the cavity and particles 70. The magnets 66 and 72 will be aligned when the appendage 60 strikes or engages the end 62 on the rim 50. The magnets 66 and 72 are arranged with their opposed pole faces of opposite polarity so that when the magnet 66 overlies the magnet 72 the magnetic force therebetween will be at a maximum. During a left turn of the shaft 32, the magnet 66 and particles 70 will wipe along the abutting face of the plate 42 until the magnet 74 overlies the particles. Here again, the magnets 66 and 74 are arranged with their abutting faces of opposite polarity so as to create the maximum magnetic field when the said magnets are aligned. It will be observed from Fig. 4, that in the position shown the magnet 66 does not overlie any portion of either of the magnets 72 or 74. It will also be observed that in relative rotation in one direction or the other the magnets will be exposed to each other over increasing areas until they are aligned as described above. Thus, in making a right turn, the resistance to current flow from the magnet 66 to the magnet 72 will gradually be decreased until the said magnets overlie. In making a left turn, the resistance to current flow between the magnets 66 and 74 will gradually be reduced until the said magnets overlie.

Figure 7:
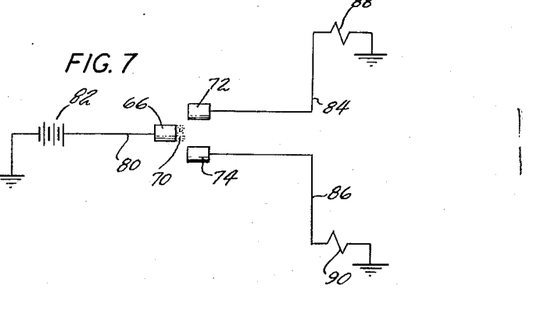
Fig. 7 is a wiring diagram showing how the resistor of Figs. 4, 5 and 6 may be employed to control current flow to a plurality of electrically operated devices.

In accordance with the present invention, and as shown in Fig. 7, the control resistor provided by the relatively movable magnets 66, 72 and 74 and by the magnetic particles 70 is utilized to vary the current flow in a power circuit to electrically operable means adapted to assist the turning of the shaft 34. That is, the magnet 66 is connected as by a conductor 80 to the battery 82 of the vehicle and the magnets 72 and 74 are respectively connected by conductors 84 and 86 to power assisting components 88 and 90 which are utilized to assist manual rotation of the shaft 34 to effect a right turn and a left turn, respectively. That is, when the magnet 66 and particles 70 are moved toward the magnet 72 so as to effect an electrical connection between the conductors 80 and 84, the element 88 is energized. The energizing current to the element 88 will be increased as the magnet 66 is moved over the magnet 72, the maximum current flow being attained when the magnets 66 and 72 are aligned. When the magnet 66 is moved toward the magnet 74 so as to effect an electrical connection between the conductors 80 and 86, the element 90 is energized, the current flow to the element 90 being increased to a maximum amount when the magnets 66 and 74 are aligned.

From the foregoing description, it will be apparent that the resilient and lost motion coupling which includes the control resistor of this invention causes turning movement of the vehicle wheels in response to manual effort. When the resistance to turning movement of the wheels requires a greater than desirable manual effort, such manual effort has caused relative displacement of the electrode-magnets to energize power assist means which may be employed to reduce the manual effort involved in overcoming the resistance to turning. If the said resistance is low or negligible, no power assist is called for, i.e., the magnets in the control resistor are not displaced so as to energize a power circuit. After the desired turn of the vehicle wheels has been effected and the manual effort to steering has been removed, the compressed rubber packs 54, 54 will return to the position shown causing return relative movement of the plates 36 and 42 to the neutral position shown in Fig. 4 and in Fig. 7 wherein there is no current flow in an energizing circuit to power assist means. Current flow to the power assist means is directly proportional to the manual effort required to effect the desired turn, such manual effort being that necessary to overcome the resistance of the vehicle wheels to a turn.

Figures 8, 9:
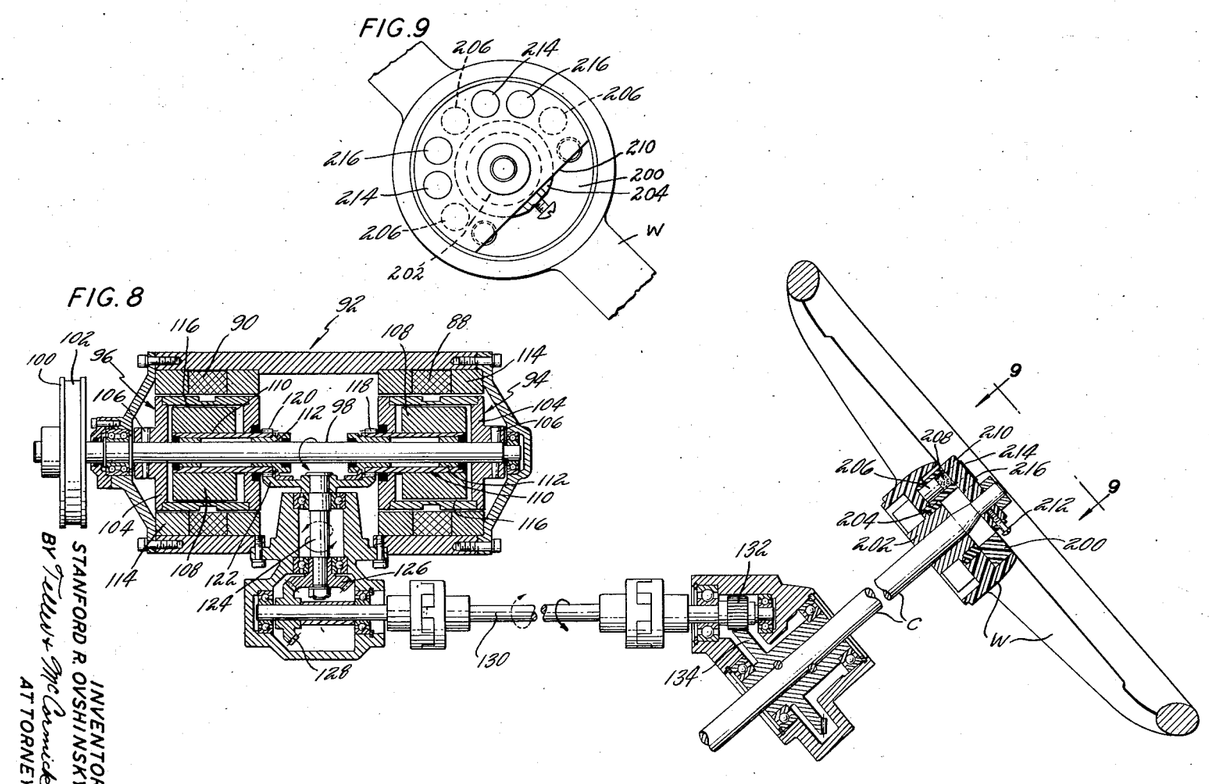
Fig. 8 is a vertical sectional view, with parts shown in elevation, of a power steering mechanism which includes a control resistor of the general type shown in Figs. 1–6.
Fig. 9 is an enlarged elevational view of the control resistor taken as indicated by the line 9—9 of Fig. 8.

In Fig. 8 there is shown a power unit indicated generally by the reference 92 and containing the right and left turn power assist elements 88 and 90, respectively. The said elements 88 and 90 may comprise the coils of a pair of electric clutches indicated generally at 94 and 96 both of which clutches are operatively associated with a drive shaft 98. The drive shaft 98 may continuously be driven in the direction of the arrow in Fig. 8 during operation of the vehicle engine by providing a pulley 100 secured to one end of the said shaft and having a belt 102 interconnecting said pulley and the drive shaft (not shown) of the vehicle engine. A power unit of the type shown has heretofore been described in my U.S. Patent No. 2,674,331 and is shown and described in my U.S. Patent No. 2,674,332.

The electric clutches 94 and 96 may take various forms and are preferably electromagnetic particle clutches, each of which has a rotor 104 connected with the driver or drive shaft 98 as by a pin 106 and each of which has a stator 108 rigidly connected with a sleeve 110 rotatably supported on the drive shaft 98 on one or more bushings 112. The coil in each electromagnetic clutch surrounds the rotor 104 in a housing 114 and when energized imposes a magnetic field between the rotor 104 and the stator 108 through magnetic particles disposed in a gap 116 between the said rotor and stator. When one of the said coils is energized, for example the coil 88 in the clutch 94, its stator 108 and its sleeve 110 will be magnetically locked with the rotor 104 to rotate therewith. The word "locked" should not be taken literally herein because there will be some slippage between the stator 104 and the rotor 108 when the coil is energized. The amount of slippage between the rotor and stator will vary inversely with the current supply to the coil. That is, when more current is supplied to the coil, there is less slipping between the rotor and stator so that the stator tends to rotate at greater speed. Each of the sleeves 110, 110 has gear teeth formed on one end thereof. The teeth formed on the sleeve of the clutch 94 being indicated at 118 and the teeth formed on the sleeve of the clutch 96 being indicated at 120. It can be said that the gear teeth 118 and 120 define pinions driven by the clutches 94 and 96, respectively, both of the said pinions engaging the teeth of a face gear 122 in diametrically opposed relationship.

The face gear 122 is fixedly connected with one end of a transfer shaft 124 which has a bevel gear 126 fixedly connected to the other end thereof. The bevel gear 126 engages a similar gear 128 connected to a motion transmitting shaft 130 which has a pinion 132 engaging a bevel gear 134 which may be connected with the previously described shaft 34 forming the driven section of the steering column in the previously described resilient and lost motion coupling.

It will be obvious that when the magnet 66 is moved toward the magnet 72 so as to energize the clutch coil 88, the pinion 118 will start to rotate with the drive shaft 98 but at a lesser speed. This will cause the transfer shaft 124 to rotate in the direction of the full line arrow and will cause the motion transmitting shaft 130 to rotate in the direction of its full line arrow. As viewed in Fig. 8, this will cause the bevel gear 134 to rotate in the right-hand turn direction thereby to assist the manual effort in effecting a right turn. As the magnet 66 is moved into alignment with the magnet 72, thereby decreasing the resistance to current flow, the current increase in the coil 88 will be reflected in a greater magnetic attraction between the rotor 104 and the stator 108 of the clutch 94 to rotate the pinion 118 with the drive shaft 98 at a greater speed, thereby increasing the power output or assist in making the right-hand turn.

When the magnet 66 is moved toward the magnet 74 to establish current flow to the coil 90 of the clutch 96, the pinion 120 will rotate with the drive shaft 98 thereby rotating the face gear 122 to cause rotation of the transfer shaft 124 and the motion transmitting shaft 130 in the direction of the broken line arrows to lend a power assist to a left turn rotation of the steering column. As the magnet 66 is moved into alignment with the magnet 74 to cause maximum current flow to the coil 90, slipping between the rotor and stator in the clutch 96 will be reduced so as to increase the speed of rotation of the pinion 120 thereby increasing the power assist in the left turn.

The control and operation of the power steering apparatus does not depend upon any specific form for the control unit or upon any specific location of the unit in the manually operated steering linkage as long as the control unit is a part of the feedback circuit system. That is, the control unit can be located in any convenient place in the vehicle steering apparatus including any location along the steering column C or the unit can be located as shown in Fig. 8 in the coupling between the steering column C and the manually operable steering wheel W. The control unit shown in Fig. 8 and as further shown in Fig. 9 comprises an annular plate 200 carried by the steering wheel W and surrounding the steering column C in spaced relationship and resiliently coupled to a collar 202 rigidly connected with the column. The means effecting the resilient coupling may comprise an annular rubber pack 204 which has its outer surface cemented to the wheel W and/or the plate 200 and which has its inner surface cemented to the outer periphery of the collar 202. It will be readily understood that limited relative movement between the steering wheel W and the column C is accommodated by manually turning the wheel W and placing the annular rubber pack 204 in shearing stress. The amount of relative movement which actually takes place between the wheel W and the steering column C depends upon the vehicle wheel resistance to turning when manual force is applied to the steering wheel.

The plate 200 carries a plurality of magnets 206, 206 (three shown) which are spaced inwardly from the outer face of the plate 200 to define cavities wherein magnetic particles 208 are disposed. In turning the wheel W relative to the column C, the plate 200 and the magnetic particles 208 are wiped across the abutting face of a plate 210 in the form of a circular segment which is secured to the extending end of the steering column C as by a set screw 212. The plate 210 supports a plurality of magnets 214, 214 (two shown) which can be engaged by the magnetic particles 208 during a right turn of the wheel W and the plate 210 also supports a plurality of magnets 216, 216 (two shown) which can be engaged by the particles 208 during a left turn of the wheel W. Similarly to the magnet 66, the particles 70, and the magnet 72 of the previously described embodiment, the magnets 206, the particles 208, and magnets 214 energize the coil 88 in the right turn clutch when the wheel W is turned to the right so as to advance the magnets 206, 206 toward an overlying position with respect to the magnets 214, 214. In the embodiment shown in Figs. 8 and 9, the magnets 214, 214 are connected in parallel with the coil 88 and the magnets 206, 206 are connected in parallel with the source of energy. Similarly to the magnet 66, particles 70, and magnet 74 of the previously described embodiment, the magnets 206, 206, the particles 208, and the magnets 216, 216 cause current flow to energize the coil 90 in a left turn of the wheel W, the current flow being increased to the coil 90 and the left turn clutch 96 when the magnets 206, 206 are advanced to positions overlying the magnets 216, 216.

When the manual effort to turn the wheel W in either direction is released, the annular rubber pack 204 will return the wheel to the position best shown in Fig. 9 wherein no current flow occurs through the electrodemagnets to either of the clutches.

Figure 10:
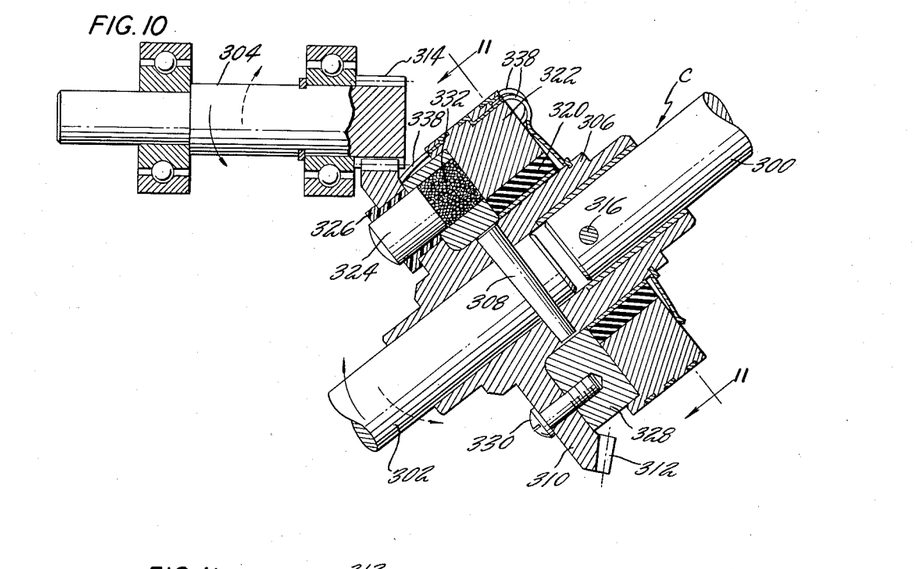
Fig. 10 is an enlarged vertical cross-sectional view of a modified control resistor applied to a power steering mechanism of the type shown in Fig. 8, parts being shown in elevation.
Figure 11:
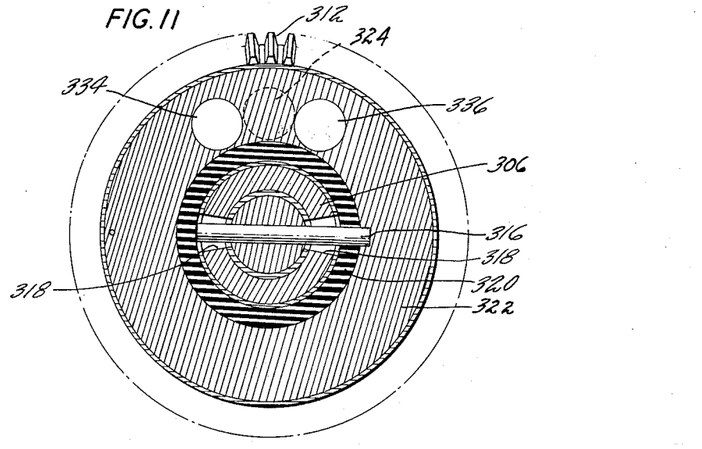
Fig. 11 is a transverse sectional view of the control unit taken as indicated by the line 11—11 of Fig. 10.

In Figs. 10 and 11 there is shown an alternative form of control unit which may be incorporated in the steering linkage-power unit combination shown in Fig. 8. More specifically, the unit shown in Figs. 10 and 11 is adapted to be incorporated in the steering column C by breaking the column into two sections 300 and 302 adjacent the point of connection with the motion transmitting shaft 304 of the power unit. The section 300 of the steering column C is rigidly connected with the steering wheel and is manually rotatable therewith. The section 302 of the steering column C is connected in the conventional manner with the wheels of the vehicle. A sleeve 306 embraces the separated end portions of the steering column sections 300 and 302 and is rigidly connected with the section 302 as by a pin 308. The sleeve 306 has a flange 310 formed thereon with bevel teeth 312 engaging the drive pinion 314 on the end of the power output or motion transmitting shaft 304.

the plate 42, the plate 42 being provided with a peripheral flange or rim segment 50 surrounding a substantial portion of the plate 36 in closely spaced relationship. The plates 36 and 42 are engaged in the aforedescribed face-to-face relationship on a bushing 52.

A resilient driving connection is made between the plates 36 and 42 by providing a plurality of rubber on rubber-like packs or inserts 54, 54 which frictionally engage the periphery of the plate 36 and the inner face of the peripheral segment 50 on the plate 42. More specifically, the rubber inserts are seated in suitable cavities 56, 56 provided in diametrically opposed locations on the periphery of the plate 36 and the said inserts are also seated within the recesses 58, 58 provided in the inner wall of the overhanging peripheral segment 50 of the plate 42. When the shaft 32 is turned or rotated by movement of a steering wheel, the rubber packs 54, 54 are compressed in the cavities and recesses 56 and 58, frictional engagement of the packs causing the plate 42 and the shaft 34 to be turned or rotated with the shaft 32. Obviously, if the resistance of the shaft 34 to turning is slight, the packs 54, 54 are only slightly compressed by the manual effort in turning the shaft 32 and causing the shaft 34 to be turned or rotated. If the resistance of the shaft 34 is relatively great, the packs 54, 54 will be further compressed in the manual effort of turning the shaft 32 before the shaft 34 is turned or rotated. The turning resistance of the shaft 34 is occasioned by resistance of the vehicle wheels to a turn. If such resistance is sufficiently great, the packs 54, 54 may be compressed to their limits within the recesses 58, 58 on the plate rim 50 and may engage one or the other end of the said recesses before the plate 42 and shaft 34 are turned.

A radially extending appendage 60 is provided on the plate 36 to engage the respective ends of the peripheral rim segment 50 on the plate 42 when the shaft 34 offers relatively great resistance to turning. More specifically, the appendage 60 will engage the end 62 of the rim 50 in a resisted right turn (clockwise as viewed in Fig. 4) of the shaft 32. After the appendage 60 has engaged the end 62 in a right turn of the shaft 32 and the plate 36, the plate 42 and the shaft 34 will turn with the shaft 32. In a resisted left turn of the shaft 32 and plate 36 (counterclockwise as viewed in Fig. 4), the appendage 60 will engage the end 64 of the peripheral rim 50 to rotate the plate 42 and shaft 34 with the shaft 32.

The appendage 60 is provided with a suitable aperture wherein there is located a magnet 66 within an insulating sleeve 68. The magnet 66 is spaced from the side of the plate 36 upon which the plate 42 is superimposed to define a cavity which is filled or partially filled with magnetic particles 70. When the shaft 32 is turned and the packs 54, 54 are initially compressed and before the appendage strikes the ends 62 or 64 of the rim 50, the said appendage will wipe across the adjacent surface of the plate 42. There are two magnets 72 and 74 located in the plate 42 with their ends located in the plane of the said adjacent surface, the said magnets being disposed within insulating sleeves 76 and 78, respectively. Now, in making a resisted right turn with the resilient coupling and wherein there is limited relative movement between the plates 36 and 42, the magnet 66 and the particles 70 will be wiped across the abutting face of the plate 42 to bring the magnet 72 over the cavity and particles 70. The magnets 66 and 72 will be aligned when the appendage 60 strikes or engages the end 62 on the rim 50. The magnets 66 and 72 are arranged with their opposed pole faces of opposite polarity so that when the magnet 66 overlies the magnet 72 the magnetic force therebetween will be at a maximum. During a left turn of the shaft 32, the magnet 66 and particles 70 will wipe along the abutting face of the plate 42 until the magnet 74 overlies the particles. Here again, the magnets 66 and 74 are arranged with their abutting faces of opposite polarity so as to create the maximum magnetic field when the said magnets are aligned. It will be observed from Fig. 4, that in the position shown the magnet 66 does not overlie any portion of either of the magnets 72 or 74. It will also be observed that in relative rotation in one direction or the other the magnets will be exposed to each other over increasing areas until they are aligned as described above. Thus, in making a right turn, the resistance to current flow from the magnet 66 to the magnet 72 will gradually be decreased until the said magnets overlie. In making a left turn, the resistance to current flow between the magnets 66 and 74 will gradually be reduced until the said magnets overlie.

In accordance with the present invention, and as shown in Fig. 7, the control resistor provided by the relatively movable magnets 66, 72 and 74 and by the magnetic particles 70 is utilized to vary the current flow in a power circuit to electrically operable means adapted to assist the turning of the shaft 34. That is, the magnet 66 is connected as by a conductor 80 to the battery 82 of the vehicle and the magnets 72 and 74 are respectively connected by conductors 84 and 86 to power assisting components 88 and 90 which are utilized to assist manual rotation of the shaft 34 to effect a right turn and a left turn, respectively. That is, when the magnet 66 and particles 70 are moved toward the magnet 72 so as to effect an electrical connection between the conductors 80 and 84, the element 88 is energized. The energizing current to the element 88 will be increased as the magnet 66 is moved over the magnet 72, the maximum current flow being attained when the magnets 66 and 72 are aligned. When the magnet 66 is moved toward the magnet 74 so as to effect an electrical connection between the conductors 80 and 86, the element 90 is energized, the current flow to the element 90 being increased to a maximum amount when the magnets 66 and 74 are aligned.

From the foregoing description, it will be apparent that the resilient and lost motion coupling which includes the control resistor of this invention causes turning movement of the vehicle wheels in response to manual effort. When the resistance to turning movement of the wheels requires a greater than desirable manual effort, such manual effort has caused relative displacement of the electrode-magnets to energize power assist means which may be employed to reduce the manual effort involved in overcoming the resistance to turning. If the said resistance is low or negligible, no power assist is called for, i.e., the magnets in the control resistor are not displaced so as to energize a power circuit. After the desired turn of the vehicle wheels has been effected and the manual effort to steering has been removed, the compressed rubber packs 54, 54 will return to the position shown causing return relative movement of the plates 36 and 42 to the neutral position shown in Fig. 4 and in Fig. 7 wherein there is no current flow in an energizing circuit to power assist means. Current flow to the power assist means is directly proportional to the manual effort required to effect the desired turn, such manual effort being that necessary to overcome the resistance of the vehicle wheels to a turn.

In Fig. 8 there is shown a power unit indicated generally by the reference 92 and containing the right and left turn power assist elements 88 and 90, respectively. The said elements 88 and 90 may comprise the coils of a pair of electric clutches indicated generally at 94 and 96 both of which clutches are operatively associated with a drive shaft 98. The drive shaft 98 may continuously be driven in the direction of the arrow in Fig. 8 during operation of the vehicle engine by providing a pulley 100 secured to one end of the said shaft and having a belt 102 interconnecting said pulley and the drive shaft (not shown) of the vehicle engine. A power unit of the type shown has heretofore been described in my U.S. Patent No. 2,674,331 and is shown and described in my U.S. Patent No. 2,674,332.

The electric clutches 94 and 96 may take various forms and are preferably electromagnetic particle clutches, each of which has a rotor 104 connected with the driver or drive shaft 98 as by a pin 106 and each of which has a stator 108 rigidly connected with a sleeve 110 rotatably supported on the drive shaft 98 on one or more bushings 112. The coil in each electromagnetic clutch surrounds the rotor 104 in a housing 114 and when energized imposes a magnetic field between the rotor 104 and the stator 108 through magnetic particles disposed in a gap 116 between the said rotor and stator. When one of the said coils is energized, for example the coil 88 in the clutch 94, its stator 108 and its sleeve 110 will be magnetically locked with the rotor 104 to rotate therewith. The word "locked" should not be taken literally herein because there will be some slippage between the stator 104 and the rotor 108 when the coil is energized. The amount of slippage between the rotor and stator will vary inversely with the current supply to the coil. That is, when more current is supplied to the coil, there is less slipping between the rotor and stator so that the stator tends to rotate at greater speed. Each of the sleeves 110, 110 has gear teeth formed on one end thereof. The teeth formed on the sleeve of the clutch 94 being indicated at 118 and the teeth formed on the sleeve of the clutch 96 being indicated at 120. It can be said that the gear teeth 118 and 120 define pinions driven by the clutches 94 and 96, respectively, both of the said pinions engaging the teeth of a face gear 122 in diametrically opposed relationship.

The face gear 122 is fixedly connected with one end of a transfer shaft 124 which has a bevel gear 126 fixedly connected to the other end thereof. The bevel gear 126 engages a similar gear 128 connected to a motion transmitting shaft 130 which has a pinion 132 engaging a bevel gear 134 which may be connected with the previously described shaft 34 forming the driven section of the steering column in the previously described resilient and lost motion coupling.

It will be obvious that when the magnet 66 is moved toward the magnet 72 so as to energize the clutch coil 88, the pinion 118 will start to rotate with the drive shaft 98 but at a lesser speed. This will cause the transfer shaft 124 to rotate in the direction of the full line arrow and will cause the motion transmitting shaft 130 to rotate in the direction of its full line arrow. As viewed in Fig. 8, this will cause the bevel gear 134 to rotate in the right-hand turn direction thereby to assist the manual effort in effecting a right turn. As the magnet 66 is moved into alignment with the magnet 72, thereby decreasing the resistance to current flow, the current increase in the coil 88 will be reflected in a greater magnetic attraction between the rotor 104 and the stator 108 of the clutch 94 to rotate the pinion 118 with the drive shaft 98 at a greater speed, thereby increasing the power output or assist in making the right-hand turn.

When the magnet 66 is moved toward the magnet 74 to establish current flow to the coil 90 of the clutch 96, the pinion 120 will rotate with the drive shaft 98 thereby rotating the face gear 122 to cause rotation of the transfer shaft 124 and the motion transmitting shaft 130 in the direction of the broken line arrows to lend a power assist to a left turn rotation of the steering column. As the magnet 66 is moved into alignment with the magnet 74 to cause maximum current flow to the coil 90, slipping between the rotor and stator in the clutch 96 will be reduced so as to increase the speed of rotation of the pinion 120 thereby increasing the power assist in the left turn.

The control and operation of the power steering apparatus does not depend upon any specific form for the control unit or upon any specific location of the unit in the manually operated steering linkage as long as the control unit is a part of the feedback circuit system. That is, the control unit can be located in any convenient place in the vehicle steering apparatus including any location along the steering column C or the unit can be located as shown in Fig. 8 in the coupling between the steering column C and the manually operable steering wheel W. The control unit shown in Fig. 8 and as further shown in Fig. 9 comprises an annular plate 200 carried by the steering wheel W and surrounding the steering column C in spaced relationship and resiliently coupled to a collar 202 rigidly connected with the column. The means effecting the resilient coupling may comprise an annular rubber pack 204 which has its outer surface cemented to the wheel W and/or the plate 200 and which has its inner surface cemented to the outer periphery of the collar 202. It will be readily understood that limited relative movement between the steering wheel W and the column C is accommodated by manually turning the wheel W and placing the annular rubber pack 204 in shearing stress. The amount of relative movement which actually takes place between the wheel W and the steering column C depends upon the vehicle wheel resistance to turning when manual force is applied to the steering wheel.

The plate 200 carries a plurality of magnets 206, 206 (three shown) which are spaced inwardly from the outer face of the plate 200 to define cavities wherein magnetic particles 208 are disposed. In turning the wheel W relative to the column C, the plate 200 and the magnetic particles 208 are wiped across the abutting face of a plate 210 in the form of a circular segment which is secured to the extending end of the steering column C as by a set screw 212. The plate 210 supports a plurality of magnets 214, 214 (two shown) which can be engaged by the magnetic particles 208 during a right turn of the wheel W and the plate 210 also supports a plurality of magnets 216, 216 (two shown) which can be engaged by the particles 208 during a left turn of the wheel W. Similarly to the magnet 66, the particles 70, and the magnet 72 of the previously described embodiment, the magnets 206, the particles 208, and magnets 214 energize the coil 88 in the right turn clutch when the wheel W is turned to the right so as to advance the magnets 206, 206 toward an overlying position with respect to the magnets 214, 214. In the embodiment shown in Figs. 8 and 9, the magnets 214, 214 are connected in parallel with the coil 88 and the magnets 206, 206 are connected in parallel with the source of energy. Similarly to the magnet 66, particles 70, and magnet 74 of the previously described embodiment, the magnets 206, 206, the particles 208, and the magnets 216, 216 cause current flow to energize the coil 90 in a left turn of the wheel W, the current flow being increased to the coil 90 and the left turn clutch 96 when the magnets 206, 206 are advanced to positions overlying the magnets 216, 216.

When the manual effort to turn the wheel W in either direction is released, the annular rubber pack 204 will return the wheel to the position best shown in Fig. 9 wherein no current flow occurs through the electrode-magnets to either of the clutches.

In Figs. 10 and 11 there is shown an alternative form of control unit which may be incorporated in the steering linkage-power unit combination shown in Fig. 8. More specifically, the unit shown in Figs. 10 and 11 is adapted to be incorporated in the steering column C by breaking the column into two sections 300 and 302 adjacent the point of connection with the motion transmitting shaft 304 of the power unit. The section 300 of the steering column C is rigidly connected with the steering wheel and is manually rotatable therewith. The section 302 of the steering column C is connected in the conventional manner with the wheels of the vehicle. A sleeve 306 embraces the separated end portions of the steering column sections 300 and 302 and is rigidly connected with the section 302 as by a pin 308. The sleeve 306 has a flange 310 formed thereon with bevel teeth 312 engaging the drive pinion 314 on the end of the power output or motion transmitting shaft 304.

A pin 316 is rigidly connected with the sections 300 and extends transversely thereof through slots 318, 318 in the sleeve 306 and in an annular rubber pack 320 embracing the said sleeve. The slots 318, 318 extend circumaxially of the sleeve 306 and the rubber pack 320 but their end walls extend generally radially so that the pin 316 is free to move within said slots between their said end walls. At least one end of the pin 316 extends into a suitable recess in a substantially circular plate or ring 322 surrounding the annular rubber pack 320. Accordingly, rotation of the column section 300 may rotate the plate 322 relative to the sleeve 306 until the pin strikes the end walls of the slots 318, 318 provided in the sleeve 306 and in the rubber pack 320. Such relative movement is resisted by the rubber pack 320 which is secured on its inner wall to the sleeve 306 and on its outer wall to the plate 322. In many steering efforts where wheel resistance is relatively low, there will be little if any relative movement between the plate 322 and the sleeve 306 during manual turning or rotation of the column section 300. However, when resistance to manual steering is relatively great, there will be relative movement between the plate 322 and the sleeve 306 during such manual turning until the pin 316 strikes one or the other of the end walls of the slots 318, 318.

It will be observed that the gear flange 310 on the sleeve 306 supports a magnet element 324 which is located within an insulating sleeve 326. A plate 328 is secured as by a plurality of screws 330 to the gear flange 310 and abuts the plate 322 in face-to-face relationship. The plate 328 defines a cavity in registry with the magnet 324 and wherein a plurality of magnetic particles 332 are disposed.

The plate 322 supports a pair of magnets 334 and 336 which are located on opposite lateral sides of the magnet 324 so that during rotation of the plate 322 relative to the sleeve 306, the magnets 334 and 336 will be wiped across the abutting surface of the plate 328 to respectively advance the magnets 334 and 336 toward and away from the magnetic particles 332. More specifically, in a right-hand turn of the steering column section 300 (clockwise as viewed in Fig. 11) the magnet 334 will be moved toward registry with the magnetic particles 332 and the magnet 324. In a left-hand turn, the magnet 336 will be moved toward registry with the particles 332 and the magnet 324.

As in the previously described embodiments, the magnets 324, 334 and 336 are connected by suitable conductors indicated generally at 338, 338 to the power source and to the clutch coils 88 and 90. More specifically, the magnet 324 is electrically connected with the coil 88 of the right turn clutch 94, and the magnet 336 is electrically connected with the coil 90 of the left turn clutch 96. During a right turn when the magnet 334 is advanced toward registry with the particles 332 and the magnet 324, the right turn clutch 94 is energized to cause rotation of the drive shaft 304 in the direction of the full line arrow thereby to drive the bevel gear flange 310 and the column section 302 in the right turn direction as indicated by the full line arrow. When the magnet 336 is advanced toward registry with the particles 332 and the magnet 324, the left turn clutch 96 is energized to rotate the drive shaft 304 in the direction of the broken line arrow thereby to rotate the bevel gear flange 310 and the column section 302 in the left turn direction as indicated by the broken arrow. When manual effort to turn the column section 300 is released, the annular rubber pack 320 will cause relative movement between the plates 322 and the sleeve 306 so as to place the magnets in the relative position shown in Fig. 11 wherein no current is supplied to either of the power assist clutches.

The invention claimed is:

1. A control resistor for reversible electrically operated means and comprising in combination, a first rotatable plate having a cavity spaced from its axis of rotation and opening on one side of the plate, a first magnet mounted in said cavity in spaced relationship to said one side and connected as an electrode to a source of electrical energy, a plurality of magnetic particles disposed in said cavity between said magnet and said one side, a second plate superimposed on said one side of said first plate and relatively rotatable therewith on said axis of rotation, and a pair of magnets supported by said second plate in spaced relationship to said axis, the said pair of magnets being spaced from said cavity so that relative rotation between the plates in one direction will position one of said pair of magnets over said cavity and relative rotation in the opposite direction will position the other of said pair of magnets over the said cavity, the said one and other of said pair of magnets being connected as electrodes in circuits with said electrically operated means to cause operation thereof in one direction and the opposite direction, respectively, when said circuits are closed, relative rotation between the plates in said one direction being effective to establish and displace a magnetic field between said first magnet and said one of said pair of magnets whereby to close the circuit and vary the current flow therein for operation of the electrical means in said one direction, and relative rotation between the plates in the opposite direction being effective to establish and displace a magnetic field between said first magnet and said other of said pair of magnets whereby to close the circuit and vary the current flow therein for operation of the electrical means in the opposite direction.

2. A control resistor for reversible electrically operated means and comprising in combination, a first plate having a cavity opening on one side thereof, a first magnet mounted in said cavity in spaced relationship to said one side and connected as an electrode to a source of electrical energy, a plurality of magnetic particles disposed in said cavity between said magnet and said one side, a second plate superimposed on said one side of said first plate, the said first and second plates being relatively movable in the plane of said one side, and a pair of magnets supported by said second plate on opposite sides of said cavity, one of said pair of magnets being connected as an electrode with said electrically operated means to cause operation thereof in one direction and the other of said magnets being connected as an electrode with said electrically operated means to cause operation thereof in the opposite direction, whereby relative movement between said plates in one direction will establish and displace a magnetic field between said first magnet and said one of said pair of magnets and will establish a circuit and vary current flow therein through said one of said pair of magnets and whereby relative movement of said plates in the opposite direction will establish and displace a magnetic field between said first magnet and said other of said pair of magnets and will establish a circuit and vary the current flow therein through said other of said pair of magnets.

3. A control device to be disposed between a drive member and a driven member, said device comprising a pair of relatively movable elements one fixed to the drive member the other fixed to the driven member, resilient means between the relatively movable elements providing a pressure for resisting movement between the elements when the drive member moves the driven member, a pair of spaced variable resistance devices carried by one element, and a device carried by the other element movable into cooperative relation with either one of the devices depending upon the direction in which the drive member moves the driven member to produce a degree of overlapping therewith conforming to the load upon the driven member.

4. A control device to be disposed between a drive member and a driven member, said device comprising a pair of relatively movable elements one fixed to the drive member the other fixed to the driven member, resilient means between the relatively movable elements providing a pressure for resisting movement between the elements when the drive member moves the driven member, a pair of spaced devices in one of said elements each comprising a magnet and magnetizable particles forming a part of a circuit, and a magnet in said other element forming the other part of a circuit, the magnets producing a chain of particles for conducting a predetermined amount of current depending on the degree the magnet in said other element is moved to a position overlapping one or the other of the magnets and particle devices in the first said element, the overlap conforming to the load on the driven member when the drive member is rotated.

References Cited in the file of this patent

UNITED STATES PATENTS

| | | |
|---|---|---|
| 1,225,507 | Sedgwick | May 8, 1917 |
| 2,203,321 | Barcom | June 4, 1940 |
| 2,261,349 | Edelman | Nov. 4, 1941 |
| 2,500,953 | Libman | Mar. 21, 1950 |
| 2,587,377 | Penrose | Feb. 26, 1952 |
| 2,590,029 | Minorsky | Mar. 18, 1952 |
| 2,668,884 | Jacobs | Feb. 9, 1954 |
| 2,754,465 | Brier | July 10, 1956 |
| 2,760,739 | Reichert | Aug. 28, 1956 |

FOREIGN PATENTS

| | | |
|---|---|---|
| 191,404 | Great Britain | Feb. 8, 1923 |